Feb. 3, 1948. G. L. LANG 2,435,502
RADIO SIGNALING MEANS FOR AVIATION TRAINERS
Filed April 29, 1942 5 Sheets-Sheet 1

INVENTOR.
GREGOR L. LANG
BY Donald V. Hillier
ATTORNEY.

Feb. 3, 1948.  G. L. LANG  2,435,502
RADIO SIGNALING MEANS FOR AVIATION TRAINERS
Filed April 29, 1942  5 Sheets-Sheet 2

GREGOR L. LANG
INVENTOR.

BY *Donald V. Hillier*

ATTORNEY.

Feb. 3, 1948. G. L. LANG 2,435,502
RADIO SIGNALING MEANS FOR AVIATION TRAINERS
Filed April 29, 1942 5 Sheets-Sheet 3

FIG. 4

GREGOR L. LANG
INVENTOR.

BY *Donald T. Hillier*

ATTORNEY.

GREGOR L. LANG
INVENTOR.

BY Donald V. Hillier
ATTORNEY.

Patented Feb. 3, 1948

2,435,502

UNITED STATES PATENT OFFICE 2,435,502

RADIO SIGNALING MEANS FOR AVIATION TRAINERS

Gregor L. Lang, West Caldwell, N. J., assignor to Link Aviation, Inc., a corporation of New York Application April 29, 1942, Serial No. 440,950

9 Claims. (Cl. 35—10)

My invention relates to an aviation trainer, and particularly to a means of training pilots in the art of navigation by radio.

One of the greatest problems in aviation is safety in flight. A great many instruments have been used with the purpose of solving this problem, one of the most important being radio. Radio aids have proved to be of great and increasing value to the navigator. Among these are the familiar A-N patterns sent out by radio range stations under the supervision of the Civil Aeronautics Administration, radio marker beacons, radio telephone, aircraft direction finders, radio broadcasts of meteorological information and those signals used as the airplane more closely approaches the airport, including outer and inner marker signals, Z marker signals and control tower instructions. It is a principal and general object of my invention to provide improved means of training and instructing pilots in the art of flying by radio in a grounded trainer such as that described in United States Patents 1,825,462 and 2,099,857.

Another object of my invention is the provision of means for simulating signals used in blind landing.

It is a further object of my invention to provide means whereby a student may be trained in the operation of radio receiving equipment ordinarily carried in an airplane, including the manipulation of the receiver, the antenna loop, and the finding of a simulated position by taking bearings upon two or more radio stations.

Still another object of my invention is to furnish means with which the student pilot may learn to handle an aircraft in response to the radio signals received.

It is a further purpose of my invention to provide means to teach the student to differentiate between the various audio-frequency signals which a pilot in flight normally intercepts.

It is also an object of my invention to provide means whereby the prospective pilot may have practice in receiving radio signals under conditions normally encountered in actual flight; for example, in a structure that climbs, dives, banks, etc., encountering conditions of static, fading, and station interference.

It is also an important object of my invention to provide radio means to be used in conjunction with an aviation trainer such as that described in U. S. Patents 1,825,462 and 2,099,857 and to which may be operatively connected a recorder that records the simulated "flight" of the trainer, such a device being explained in detail in U. S. Patent 2,179,663, to make it possible by use of the resulting combination for an instructor, by referring to the position of the trainer, simulated by the position of the recorder on the map, to transmit to the student the radio signals which he would receive were he in actual flight at a point corresponding to his simulated or assumed position.

Figure 1:
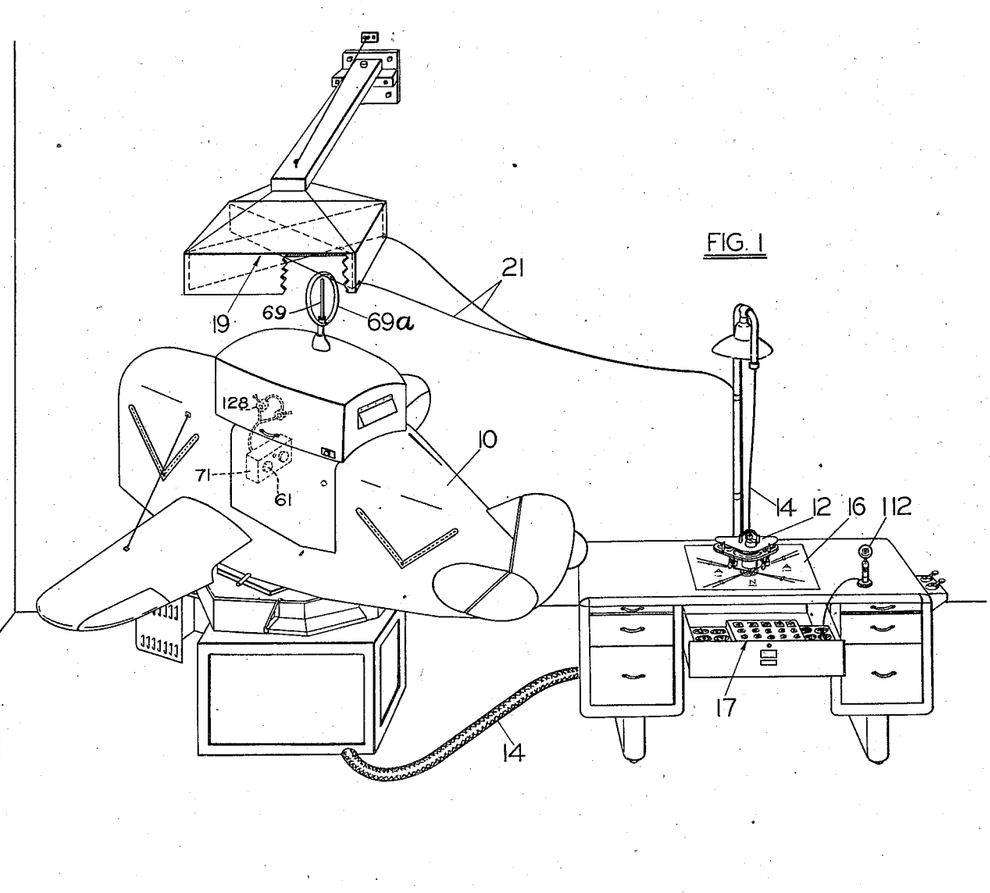
Fig. 1 is a diagrammatic illustration of the trainer and recorder mentioned above and showing the general relation thereto of the parts of the instant invention.

The above U. S. Patent 1,825,462 and U. S. Patent 2,099,857 disclose a trainer pivotally mounted upon a universal joint for tilting in all directions as well as turning about the vertical axis through 360°. Such a trainer is shown in Fig. 1 and is designated by the number 10. The student in the trainer can produce these movements in the same manner that a real plane is made to respond accordingly. U. S. Patent 2,179,663 discloses in detail a recorder, designated by the number 12, to be used in conjunction with such a trainer. This recorder has propelling wheels as well as an inking wheel to trace the assumed track or course assumed to be flown by the trainer on the map 16 upon which the recorder is placed. This recorder is electrically connected to the trainer by means of cable 14 so that any turning movement of the trainer produces a like turning movement in the direction of the recorder's travel. The recorder disclosed in that patent moves at a constant speed. The instructor places the recorder upon the map at the point where he assumes the trainer to be located, and the simulated flight of the trainer, which at all times makes no actual forward movement, is traced upon the map by the recorder, which, of course, does make forward movement over the map. This makes it possible for the instructor, by observing the position of the recorder upon the map, to ascertain the assumed geographical position of the trainer at any given instant. Knowing this assumed position, it is a simple matter with the invention which is about to be described for the instructor to transmit to the student in the trainer by radio signals exactly like the radio signals which he would receive were he in actual flight at the point indicated by the recorder's position. The preferred location of the control panel (designated generally by 17) of the transmitting systems of this invention is shown in Fig. 1. As will be seen from Fig. 1, in my preferred embodiment the transmitting antenna (designated generally by 19) which is operatively connected to the control mechanism by means of wires 21 is disposed over the trainer 10 and in relatively close position is the receiving antennae 69 and 69a. This close positioning makes it possible to employ a low output transmitter thereby preventing any interference with real range stations, or any other transmitters no matter how close thereto the apparatus of this invention may be located. Thus when the preferred embodiment of my invention is used, several transmitting systems and trainers may be operated in close proximity without interference.

A description of the functioning of the present invention, when used in conjunction with such a recorder and trainer, will be given after the detailed description of the mechanical and electrical aspects of my invention is presented.

The objects of my invention are satisfied by my preferred embodiment which includes means for generating radio carrier waves of variable frequency, means for modulating these carrier waves to simulate all audio-frequency signals and other intelligence encountered in actual flight, means for transmitting the modulated carrier waves and for directionally controlling the radiated pattern, means for controlling the strength of the transmitted signals and means for receiving the controlled modulated carrier waves. This last means may be of any well known type presently used for this purpose.

The above and other objects of my invention will become apparent as the description of a preferred embodiment of my invention, shown in the accompanying drawings, proceeds. In these drawings, wherein like reference numerals indicate like parts.

It will be noticed that many of the important elements which form a part of my invention are shown in block diagram form because the detailed construction thereof forms no part of this invention. For example, the oscillators and amplifiers which are hereinafter referred to may be of any suitable known type, my invention residing in the combining of these individually well-known elements in a manner to be later fully disclosed.

It should be pointed out at this point that it is possible to satisfy certain of my objects by the use of a single transmitting station while other objects are better satisfied by the employment of at least two such stations. For example, the range stations which are about to be described are generally employed by the aviator singly, for one station usually gives him all the signals he needs, so the instructor can send out these range signals from one of my transmitters only; or should the plane be within the pattern sent out by two such stations, the instructor can put both of my stations into operation. However, in determining a radio "fix," it is necessary for a pilot to ascertain by means of radio direction finding apparatus the direction from the plane in flight of at least two transmitting stations. The location of the stations being known, the intersection of the two bearings made upon these stations determines the position of the plane on the earth's surface. In order that this important navigational practice may be simulated, my invention includes the use of two radio transmitting systems which may transmit simultaneously upon different carrier frequencies modulated by different or like audio-frequency sources. However, it should be stated that one directional transmitter only is necessary to simulate the practice in actual flight of securing one line of position by radio and the other by some other means, as by pilotage or celestial navigation.

Figure 2:
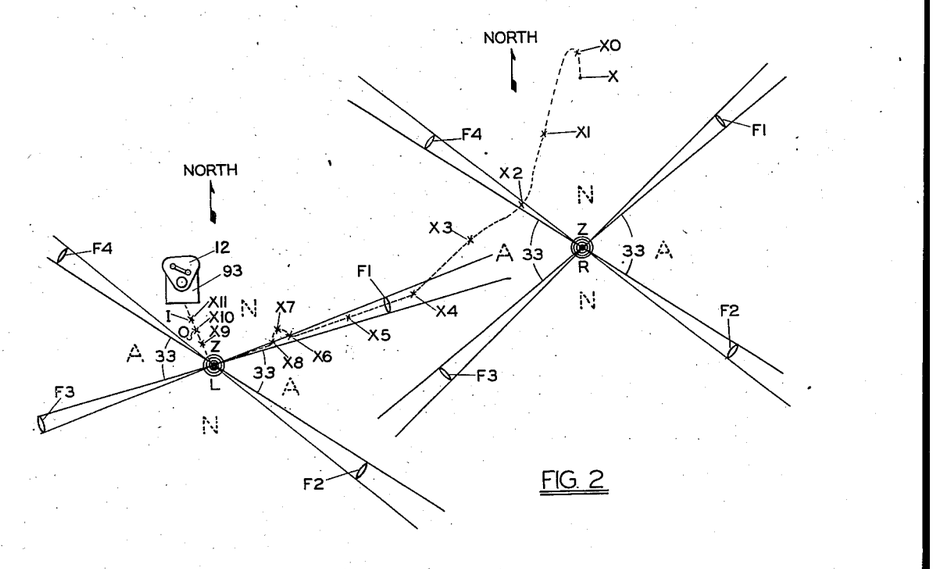
Fig. 2 is a diagrammatic view of a map and recorder by means of which the "flight" of the student may be recorded.
Figure 3:
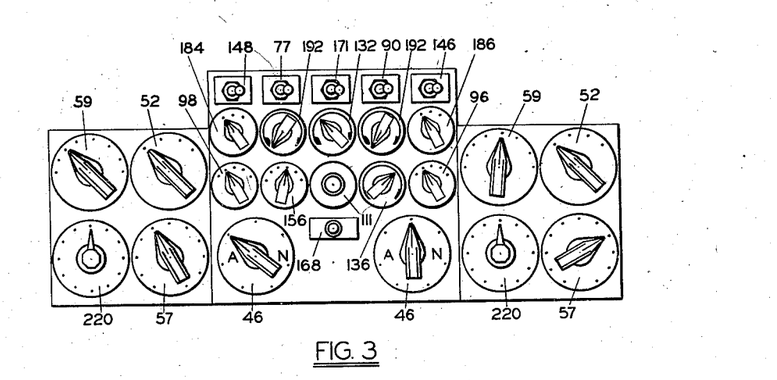
Fig. 3 shows the instructor's control panel.

In order that the following description may be more easily understood, the transmitting stations of this invention have been designated as the left and right stations. Fig. 3 shows the control panel, the left half of which embodies the controls for my left station and the right half embodies the controls for my right station. Certain controls common to both transmitting systems are located in the center. Fig. 2 shows the radiated field pattern of two range stations L and R which are assumed to be my left and right stations respectively.

Figure 4:
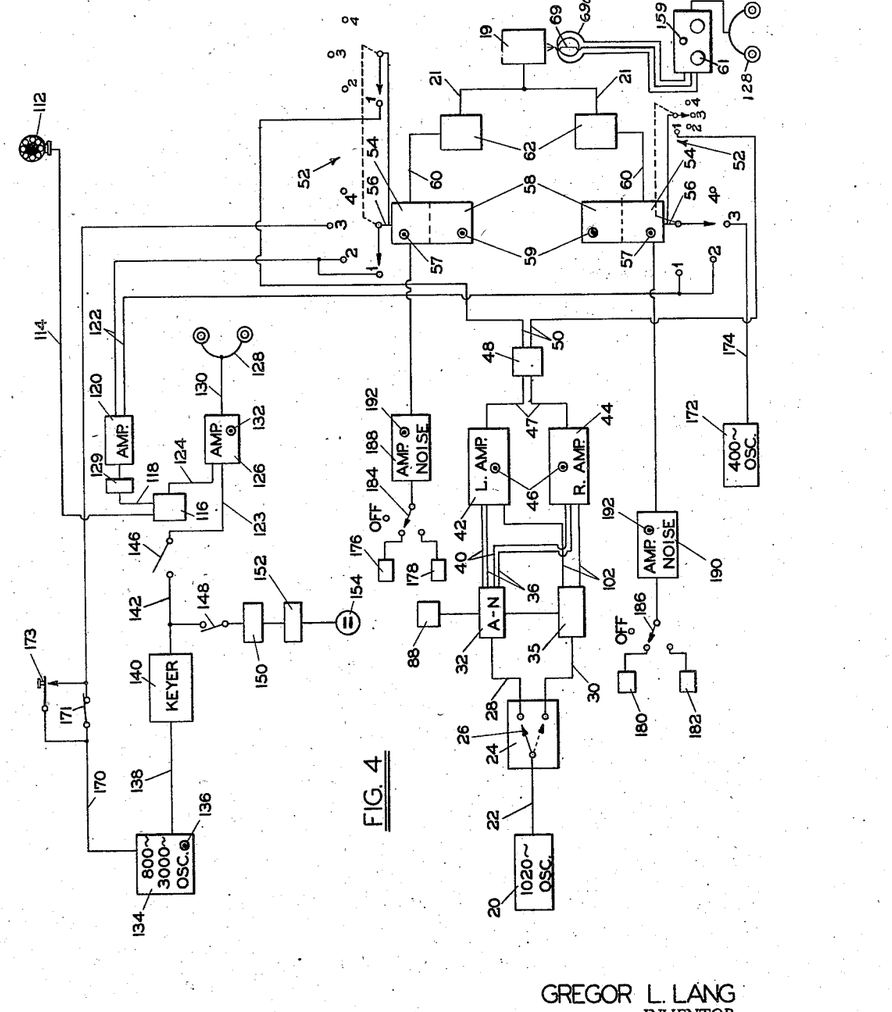
Fig. 4 is a diagrammatic illustration of the basic apparatus of this invention.

Fig. 4 shows the basic signaling apparatus of this invention. It will be noticed that a great many parts therein are duplicated. In that event, the upper part is embodied in the left transmitting system, while the lower part is in the right system. The same is true of Figs. 5 and 6.

Radio range station signals

Any invention which has the above objects must have means for simulating the signals which are sent out by the aforementioned radio range system of the Civil Aeronautics Administration. In this system each range station marks four courses, normally 90° apart, although this spacing is often varied in order that one or more of the courses will coincide with an established airway. This system utilizes, generally, two pairs of transmitting towers which transmit interlocking Morse code signals. For instance, one pair of towers may be transmitting directionally the letter A (. —), while the other pair sends out the letter N (— .), the timing being synchronized so that at all times one of the pair of towers is transmitting a signal.

This arrangement produces the result that in two diagonally opposite quadrants, as shown in Fig. 2, the letter A is heard clearly and the letter N is of a lesser intensity or not heard at all, depending upon how far the plane is from an N quadrant. In the other two quadrants the relative intensities of the letters are reversed. Each quadrant slightly overlaps the neighboring ones, and in the narrow wedge of about 3° that forms the center of the overlap the letters A and N are heard with equal intensity, so the dots and dashes of the two signals interlock to produce a continuous tone. This is the familiar "on-course" signal. The four "on-course" beams of each radio station are shown in Fig. 2. Each of these beams is numbered 33.

These A-N signals are interrupted about twice each minute for the transmission of two sets of station identifying signals. The first set of these identifying signals is always transmitted in the N quadrants by the N towers and the second set in the A quadrants by the A towers. If a pilot is near the bisector of an N quadrant, he will hear the N signal (—.) and the first station identification signal, but will not hear the A signal (.—), nor the station identifying signal which is transmitted into the A quadrants.

If he is on course, he will hear a dash about 25 seconds long, caused by the interlocking of the A and N signals, followed by the two sets of identifying signals, the first of which is transmitted by the N towers and the second by the A towers. If any departure from the course occurs, one interlocking signal and its corresponding identifying signal becomes noticeably weaker. If the N signal and the first station identification signal is the weaker, the pilot knows that he is in an A quadrant, while if the A signal and the second station identification signal is the weaker, he knows he is in an N quadrant. Different range stations transmit on different carrier frequencies, but these audible signals are always of the same frequency, namely, 1020 cycles per second.

*Means for producing radio range A-N and station identification signals*

Figure 5:
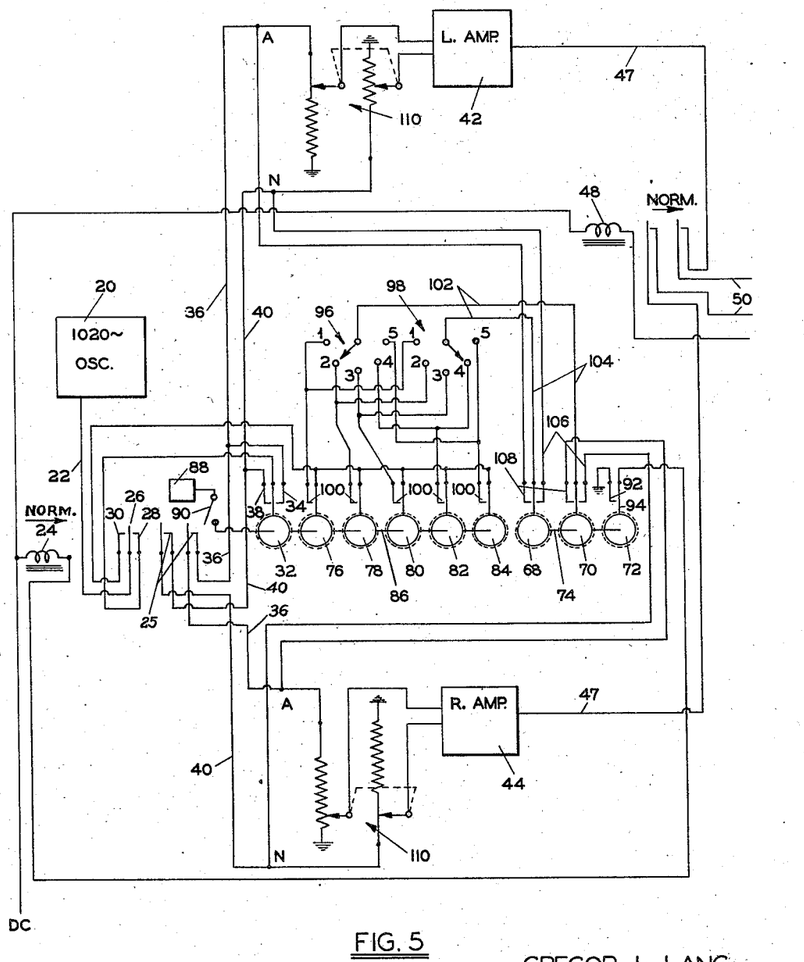
Fig. 5 is a diagrammatic illustration of that portion of the invention which produces the modulation signals to be applied to the radio frequency carrier waves in such a manner as to simulate radio range stations.

Range station signals are simulated in the use of my invention by the following means. Referring to Fig. 4, the reference numeral 20 indicates an oscillator of any suitable type and suitably supplied with power which generates a 1020 cycle current. This current passes through the wire 22 into relay 24. Normally, relay 24 is in such position that the current passes along wire 28 through the circuit governed by the A-N cam 32 rather than along wire 30 through the circuit governed by the station identification cams 35. This cam 32 is of a familiar type and is connected in such a manner that impulses of current corresponding to the Morse code letter A are carried by the wires 36 while those corresponding to the letter N are carried by the wires 40. It will be noticed that a wire carrying letter A and another carrying letter N connect the A-N cam 32 with the left transmitter isolating amplifier 42 and a like pair of wires go from the A-N cam to the right transmitter isolating amplifier 44. These two amplifiers are each provided with a control knob 46 by means of which the instructor can vary the relative intensities of the interlocking A-N signals. Because of the nature of the function of these knobs 46 which are also shown upon the control panel in Fig. 3, they are referred to in the art as the A-N mixers, and hereinafter will be referred to as such. A more detailed view of the working of these mixers is shown in Fig. 5 which will be hereinafter discussed in detail.

The A-N signals leave the amplifiers 42 and 44 and are carried along the wires 47 to the relay 48. This relay is controlled by a switch (not shown) in the cockpit of the trainer, thus making it possible for the student to select at any time the signals originating in the 1020 oscillator. Assuming this switch to be correctly positioned, the A-N impulses leave relay 48 by means of wires 50 and are carried to the terminals 1 of the gang selector switches (each designated generally by 52). These selector switches 52 are also shown on the control panel in Fig. 3. The functioning of these switches will be later fully discussed, it being sufficient to state here that by means of the switch 52 in either of the transmitting systems, the instructor can select that type of modulation with which he desires to modulate the carrier waves of each of my transmitting systems.

Assuming the selector switches 52 to be in the position of the upper selector switch 52 in Fig. 4, the audio-frequency waves originating in oscillator 20 pass into the modulator amplifiers 54 by means of wires 56 where they modulate the radio frequency carrier waves which are tuned by the oscillators 58 and which are then appropriately fed into the modulated amplifiers 54. Each oscillator 58 is provided with a control 59 also shown in Fig. 3 which makes it possible, as will be later more fully disclosed, for the instructor to vary the frequency of the carrier waves. Wires 60 then carry the modulated radio frequency carrier waves to the goniometers 62 from whence they are carried by leads 21 to transmitting antenna designated generally as 19. Receiving antenna 69 then picks up the transmitted frequencies and they are fed into radio receiver 71 in trainer 10.

In the event relay 24 is in the opposite position, reference to Fig. 4 will disclose that instead of passing through the circuit governed by A-N cam 32 the 1020 cycle wave passes by means of wire 30 through the circuit governed by the station identification cams 35, and thence by means of wires 102 to the amplifiers 42 and 44, by wires 47 to relay 48 and to terminals 1 of the selector switches 52 by means of wires 50. The 1020 cycle tone, as interrupted by the station identification cams 35, if selector switches 52 are positioned as is the upper selector switch 52 in Fig. 4, will then enter modulated amplifiers 54 where the radio frequency waves generated by oscillators 58 will be modulated, and the modulated radio frequency waves then are led by wires 60 to goniometers 62, and then by wires 21 to transmitting antenna 19. It will therefore be realized that when upper selector switch 52 is placed on terminal 1 my left transmitting system is transmitting either A-N signals or station identification signals, and when lower selector switch 52 is likewise placed the same is true of my right transmitting system, providing, in both cases, that student controlled relay 48 is correctly positioned.

From the immediately foregoing description the general system provided by this invention for the transmitting of A-N range and station identification signals will be understood.

Specifically, it should be noted that whenever oscillator 20 is generating a 1020 cycle tone, depending upon the position of relay 24, the tone is interrupted either in an A-N pattern or in a station-identification call letter pattern. In either case, the interrupted tone is fed into the isolating amplifiers 42 and 44, and if the student in the trainer has placed his switch which governs relay 48 in the correct position, the interrupted tones pass to terminals 1 of the selector switches 52. Then if the instructor has placed either of the switches 52 upon its terminal 1, the A-N and station identification tones pass into the associated modulated amplifier 54 where they modulate the radio frequency carrier waves generated by the associated oscillators 58. The modulated carrier waves then pass to the associated goniometer 62, and from there to transmitting antenna 19. It will be understood that either or both of my transmitting systems may be transmitting A-N and station identification signals, whether each system is so doing depending upon the position of the selector switch 52 in that system which is positioned by the instructor, and the position of student controlled relay 48.

The frequency control knobs 59 are generally set so that each of the oscillators 58 generates a carrier wave of a frequency different from the other, and, therefore, only one transmitting antenna need be used.

Detailed circuits for accomplishing the above are shown in Fig. 5 to which reference is now made. As seen in Fig. 5, a relay 24 is normally deenergized and contact is made between members 26 and 28 so that the 1020 cycle wave travels to the switch governed by A-N cam 32. This cam has a peripheral pattern such that it sends the 1020 cycle wave in the pattern of the Morse code signal for the letter A (. _) along contact 34 and wires 36 into the A terminals of potentiometers designated generally by 110, one of which is present in the left as well as right transmitting system. At the same time, cam 32 sends the 1020 cycle wave originating in oscillator 20 in the Morse code pattern for the letter N (_ .) by means of contact 38 and wires 40 into the N terminals of potentiometers 110. Therefore, A and N impulses are fed into each of the potentiometers 110, and from each potentiometer the impulses are fed into the associated amplifier 42 or 44, and thence by wires 47 to relay 48; from relay 48 by means of wires 50 they are carried to terminals 1 of selector switches 52. If, as previously stated, the instructor has placed either of the selector switches 52 upon its associated terminal 1, and relay 48 is correctly positioned, the A-N range signals will, by the previously described apparatus, modulate the radio frequency carrier wave generated by oscillators 58 and eventually be transmitted by antenna 19.

Cams 68, 70 and 72 (switching cams) are rigidly attached to a rotating shaft 74, and cams 32 (the A-N cam), 76, 78, 80, 82 and 84 (station identification cams) are likewise affixed to another shaft 86. Both of these shafts are turned by motor 88 when switch 90 is closed. Switch 90 is shown on the control panel in Fig. 3. Shaft 86 is turned directly by motor 88, and by means of a cam and ratchet arrangement (not shown), or other suitable means, shaft 74 is made to turn intermittently 1/14 of a revolution for each revolution of shaft 86. Whenever cam 72 reaches a certain point in its revolution, it makes contact between members 92 and 94 thereby completing the circuit which energizes the range switching relay 24, causing this relay to break the contact between the members 26 and 28 and making contact between members 26 and 30. This changes the normal course of the continuous 1020 cycle wave from its path along wire 28 to the A-N cam 32 and makes the contact necessary to carry this signal along wire 30 to the circuits governed by the station identification cams 76, 78, 80, 82 and 84. Each of these five cams has a peripheral pattern different from the others and the pattern of each is such that as it rotates, if the circuit is properly closed, it will interrupt the 1020 cycle audio-frequency wave in a manner corresponding to the Morse code call letters of a certain station.

Still referring to Fig. 5, it will be noticed that two range station identification selector switches 96 and 98 are provided. These two switches which are also under the control of the instructor are shown in Fig. 3. The position of switch 96 determines which station identification letters will be transmitted by my right station, while switch 98 likewise governs the left station. It will be noticed that switches 96 and 98 may be made to complete a circuit in which either of the cams 76, 78, 80, 82, or 84 is a controlling part. These cams interrupt the 1020 cycle signal in the appropriate Morse code pattern by intermittently making and breaking the circuit at points 100. Therefore, by means of switches 96 and 98 and the members controlled thereby, the steady 1020 audio-frequency note generated by oscillator 20 may be interrupted in a manner simulating the call letters of any one of five stations, each station being represented by one of the instantly considered five cams.

However, it should be borne in mind that the station identification cams become effective only while cam 72 is positioned so as to energize relay 24. At all other times A-N cam 32 interrupts the 1020 tone.

These switches 96 and 98 being properly set, the 1020 cycle wave, as interrupted by the station call cam selected in each transmitting system, passes along wires 102, one each of which is in a circuit governed by cams 68 or 70. These two cams make it possible in my invention to simulate the practice of transmitting station identification letters first in the N quadrants and then in the A quadrants. Fig. 5 shows that cam 70 is in the circuit connected to my right transmitter, while cam 68 is in the circuit connected to the left transmitter. Cam 70 performs the same function for one of my stations that cam 68 does for the other. Cam 72 retains the position necessary to maintain contact between members 92 and 94 and therefore energizes relay 24 for two revolutions of cams 76, 78, 80, 82 and 84, and consequently, the station call letters are repeated twice. Cams 68 and 70 have peripheral patterns such that by making contact between members 104 and 106 for the first set of call letters, the first identification signals are sent into the N terminals of the potentiometer in each of the transmitting systems; and then by making contact between members 104 and 108, the second set of station identification signals pass into the A terminals.

From the preceding description it will be understood that the 1020 audio note ordinarily passes from wire 22 and member 26 to wire 28 and is then interrupted by the A-N cam 32 from whence the keyed note passes along wires 36 and 40 to the terminals A and N of both of my transmitting systems. The Morse code A signals enter terminals A and the Morse code N signals enter terminals N. But periodically, cam 72 completes the circuit that energizes relay 24, causing the 1020 note to pass from element 26 along wire 30. In this case the audio note is keyed twice by two of the station identification cams 76, 78, 80, 82, or 84 depending upon the position of switches 96 and 98, the first set of signals keyed by each of two cams being sent by means of cams 67 and 70 along wires 106 into the N terminal of each system and the second set along wires 108 into the A terminals. Switch 96 will ordinarily select a different cam than switch 98 because each of the systems herein described simulates a different radio range station, and no two of these stations have the same identification letters. It should be noticed that switch 96 and cam 70 form a part of the right transmitting system, and that any one of the cams 76, 78, 80, 82 or 84 may be made a part thereof by correctly positioning switch 96, while switch 98 and cam 68 are a part of the left system, and by positioning switch 98, any one of the same cams 76, 78, 80, 82, or 84 may be made a part thereof. Also, these cams and switches are effective only so long as cam 72 is in a position to energize relay 24. At all other times the A-N signals enter amplifiers 42 and 44.

At the same time that relay 24 is energized it breaks the contacts at the points 25 so that the station identification signals fed into one potentiometer 110 will not follow back along the course of the A-N signals to the potentiometer of the other system. This is necessary because while both systems transmit A signals and N signals simultaneously, each must transmit different station identification signals.

Each of the control knobs 46, shown in Figs. 3 and 4, governs the working of one of the dual potentiometers shown in detail in Fig. 5 and designated generally by 110. These potentiometers are of such a nature that by turning one of the knobs 46 in a clockwise direction, the resistance in that branch of the circuit shown in Fig. 5 associated with that knob carrying the A signal is increased while the resistance in the N part is decreased. Likewise by an opposite turning the resistance in the N branch may be increased and a decrease in the A branch will occur simultaneously. These changes in resistance cause a change in the relative intensities of the A and N signals that enter amplifiers 42 and 44. The knobs 46 will therefore be set by the instructor so that the relative strength of the A-N signals before entering the amplifiers 42 and 44 will be according to the assumed position of the trainer in relation to the A and N quadrants of the radio range field pattern as represented by the position of the recorder 12 on the map 16.

As shown in Fig. 5, the A signal travels along wires 36 and enters the terminals A of the potentiometers 110 while the N signals enter the terminals N by means of wires 40. The control knobs 46 having been previously positioned by the instructor for proper relative A-N strength according to the assumed position of the trainer, thereby appropriately positioning potentiometers 110, and the first station call letters as above explained being made by means of cams 68 and 70 to go into the N terminals, the station identification signals will be appropriately loud or soft depending on what quadrant the plane is assumed to be in. That is, if, for example, the student is receiving a loud N and a soft A signal, which means that he is in an N quadrant, the first set of station identification letters, which are the ones transmitted into the N quadrants, will be loud and the second set, which are the ones transmitted into the A quadrants, will be soft, while if he is receiving a soft N and a loud A, meaning that he is in an A quadrant, the first set of station identification signals will be soft and the second set loud. Upon reaching the amplifiers 42 and 44 the 1020 cycle current, having been keyed by the selected station's call letters, assumes the same path as the A-N impulses which, as above discussed, are led into the amplifiers. This path, as shown in Fig. 4, is along wires 47 to relay 48 and by wires 50 to the terminals 1 of the switches 52 and thence into modulated amplifiers 54 to goniometers 62 and antenna 19.

After cam 72 has reached a later stage in its rotation on shaft 74, it breaks the contact between members 92 and 94 in Fig. 5 thereby preventing a flow of current through relay 24. This breaks the contact between elements 26 and 30 and re-establishes contact between members 26 and 28 and at the points 25, so the 1020 cycle audio-frequency signal will assume the normal course of passing through the circuit governed by A-N cam 32, and from there along wires 36 and 40 to the A and N terminals of the potentiometers 110 of the left and right transmitting systems.

From the immediately above described elements of my invention, it will be realized that I have provided means with which two range stations sending out the usual A-N pattern periodically interrupted by different call letters may be simulated, and further, the A and N signals and the two sets of call letters may be given the same relative strength as they would actually have at an assumed point in either station's field pattern. By means of knobs 51 shown on the control panel in Fig. 3 and in Figs. 4 and 6, one of which is provided for each transmitting system, the volume of all of these transmitted signals may be varied according to the assumed distance of the plane from either station.

However, it should be noted that only one of my transmitting stations need be used if desired.

*Weather reports and control tower instructions*

These same range stations sending out the above described A-N and station identification signals often times simultaneously transmit on the same carrier frequency as the range signals meteorological information by means of voice. On the other hand, control tower instructions which are verbal in nature are generally transmitted on a carrier frequency of 278 kilocycles, no other signals being transmitted therewith. This invention provides means whereby the instructor can transmit by radio weather and other information at the same time that range (A-N and station identification) signals are being sent, thereby simulating the former practice, as well as means for transmitting by radio voice alone to the student, which makes it possible to simulate control tower instructions.

Figures 6, 7:
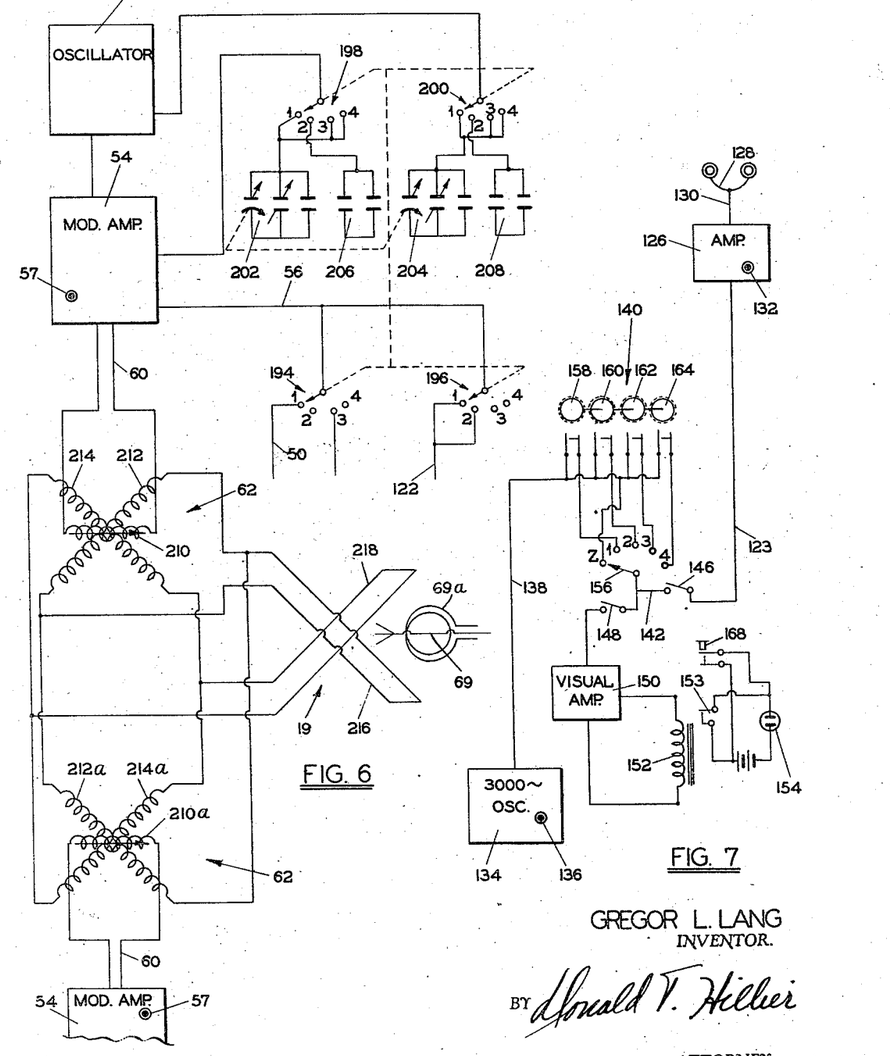
Fig. 6 shows diagrammatically and in detail that part of the invention which is used to determine the frequency of the radio carrier waves as well as means for selecting the type of modulation to be applied to the carrier waves. This figure also shows the means employed in my preferred embodiment for transmitting radio signals from a radio station according to the assumed geographical direction from a station of a plane in flight.
Fig. 7 shows diagrammatically another important signaling part of my invention.

Referring to Fig. 4, a microphone 112 which is suitably supplied with power is connected by means of wire 114 to relay 116. Relay 116 is governed by a button switch 111 which is shown on the control panel in Fig. 3. If this switch is in the outer position the signals carried by wire 114 go from relay 116 by means of wire 118 through relay 129 into the microphone amplifier 120 from whence they are carried by means of wires 122 to the terminals 1 and 2 of a part of gang switches 52. This is also shown in Fig. 6.

Inasmuch as the range signals also go to terminals 1 of another part of switches 52, it will be realized that it is possible for the instructor, by means of the microphone 112 to transmit to the student verbal intelligence at the same time that the range signals are being transmitted, in simulation of the transmitting of weather reports by range stations simultaneously with the transmitting of range signals.

An aircraft in flight has filtering means with which the pilot, if he does not desire to receive both the range signals and the verbal signals, can select either the range signals or the voice modulations which are coming in on the same carrier frequency. Means for simulating this practice has also been provided. As will be seen in Fig. 4, the normal condition is for the range signals to leave amplifiers 42 and 44, go through relay 48 and to the terminals 1 of one section of switches 52. Microphone communications go from microphone 112 to terminals 1 and 2 of another section of switches 52. By means of a switch (not shown) in the cockpit of the trainer, the student may work relay 48 thereby preventing the range signals from entering terminals 1 of switches 52. By means of another switch in the trainer under the control of the student he may also work relay 129 to prevent any modulation originating at the microphone 112 from entering these same terminals. Therefore, when range and verbal signals are both entering terminal 1 of switches 52 the student can select either one or both.

However, it is to be noticed that when relay 116 which is governed by switch 111, which switch is under the control of the instructor, is positioned to send the voice signals originating at the microphone 112 into the amplifier 126 and earphones 128, the student has no means of cutting these signals off. Thus the instructor can always communicate with the student and the student may reply through an interphone system (not shown). The instructor will send his verbal instructions over this interphone system only when they are of a nature such that a pilot in flight would never receive them. For example, if the instructor sees that the student is not correctly responding to the radio signals being transmitted to him, the instructor can talk to the student by means of microphone 112 and earphones 128 by correctly positioning switch 111 which governs relay 116.

If the instructor desires to transmit simulated control tower instructions to the student, the instructor places button 111 and therefore relay 116 in the radio position, switch 52 in the 2 position, and then talks into microphone 112. As seen in Fig. 4, the only signals that can then enter modulated amplifier 54 are those originating at microphone 112.

As seen in Fig. 1, these earphones 128 are also connected to the previously mentioned radio receiver in the trainer so that the student receives all communications through the same set of phones.

Radio markers

While the A–N and station call signals are the most important utilized by pilots while they are at a considerable distance from the range station, there are also radio markers of three types designed to indicate to the pilot flying a radio range "on-course" beam his position along such course. As above stated, range stations send out a pattern which results in four on-course beams. A pilot flying along any one of these beams will receive the steady on-course signal and he knows that by following this signal in the correct direction, he will be led to a point directly above the range station from which these signals are transmitted. However, a pilot many times upon intercepting one of these on-course beams has no easy means of determining which of the four beams he has encountered. Therefore, it is now common practice to provide, at some point along each of these four beams, a small signal station known as a fan marker. As the name implies, the radiated field pattern of these markers is in the shape of a fan, extending vertically upward from the transmitting antenna with its major axis at a right angle to the range course and its minor axis parallel to the range course. These fan markers, which are shown in Fig. 2 and designated F1, F2, F3, and F4, are always on a carrier frequency of 75 megacycles modulated by a 3000 cycle audio-frequency note which is further keyed in one, two, three and four dash groups in order that the fan marker may identify the particular leg of the range station. Aircraft in flight carry a receiver always set at a frequency of 75 megacycles to intercept these signals. In my invention no such receiver is provided, but rather the following means make certain that the student at all times receives these signals if the instructor so desires.

Referring to Figs. 4 and 7, oscillator 134, upon which is a suitable volume control 136, also shown in Fig. 3, generates a 3000 cycle note which is fed along element 138 into a keyer designated generally as 140. From keyer 140 it may take two possible paths singly or simultaneously. The first of these paths is along wire 142, and if switch 146 be closed, along wire 123 into interphone amplifier 126 to earphones 128. Switch 146 is the aural marker switch and is shown in Fig. 3.

Certain airplanes are provided with a visual marker to receive these same fan marker signals. As the plane passes over the fan marker instead of or in addition to receiving a keyed 3000 audio cycle note, the same signal causes a small light on the dash of the cockpit to flash in a manner corresponding to the aural signal of the marker in question. In my invention, this may be simulated by means of the visual marker switch 148 shown in Figs. 4 and 7. This controls the second possible path of the signal after it leaves keyer 140. If this switch, which is on the control panel as shown in Fig. 3, is closed by the instructor, the 3000 cycle wave, as interrupted by the keyer 140 passes into the visual marker amplifier 150 which in turn governs visual marker relay 152 which opens and closes switch 153 in a manner corresponding to the signal of the marker in question, thus causing the flashing of a light 154 upon the instrument panel in the cockpit of the trainer.

Keyer 140 which is generally shown in Fig. 4 is shown in detail in Fig. 7 together with switches 146, 148, and 156. It will be noticed that switch 156 which is also located upon the control panel in Fig. 3 has five possible terminals, viz., Z, 1, 2, 3, and 4. The Z terminal will be discussed later. Terminals 1, 2, 3 and 4, it will be seen, may be used to complete the respective circuits governed by the cams 158, 160, 162 or 164. Each of these cams will interrupt the 3000 cycle note, if switch 156 be properly placed, in the same manner that cams 76, 78, 80, 82 and 84 interrupt the 1020 cycle note, except of course, the pattern of interruption will be such as to transmit a different identifying signal. When the instructor, viewing the moving recorder 12 upon the map 16, sees that the student is flying over one of the fan markers F1, F2, F3, or F4, he places switch 156 on the correct terminal and by closing the aural marker switch 146 for the correct length of time, allows the 3000 cycle note as keyed by the correct cam 158, 160, 162, or 164 to pass through the interphone amplifier 126 to the earphones 128. Thus the student always gets these signals, just as the pilot in a plane with a receiver constantly tuned to 75 megacycles. If the instructor closes switch 148 in Fig. 7, relay 152 will be energized and deenergized according to the peripheral pattern of the cam in the circuit, and therefore, switch 153 will be alternately closed and opened, causing light 154 to flash in the desired pattern. If both switches 146 and 148 are closed, the student will receive both audible and visual fan marker signals.

The visual marker light may be made to flash in any desired manner as shown in Fig. 7 by means of button switch 168 which is also shown in Fig. 3. The pushing of this button by the operator completes the circuit in which is included the light 154.

It will therefore be understood that in my invention the transmission of fan marker signals to a plane in flight may be simulated so that the student in the trainer receives the signals through his earphones and/or by the flashing of a light upon the instrument panel, just as the pilot in a real plane receives his signals through his earphones or the flashing of a light upon his instrument panel. With my invention the flashing of a light may be accomplished in two ways, viz., by closing visual marker switch 148 and the selection of the desired pattern by selector switch 156, or by the pressing of switch 168 in the desired pattern. Also, in my invention instead of employing a receiver constantly tuned to a carrier frequency of 75 megacycles and transmitting the fan marker signals upon that frequency, as is the case in the plane in actual flight, the aural fan marker signals are transmitted by means of the interphone system. In this manner the student in the trainer always gets the aural signals, just as he would in actual flight, but it is not necessary to transmit the signals upon a carrier frequency of 75 megacycles which would make it necessary to carry in the trainer an auxiliary receiver tuned to that frequency.

In certain systems of instrument or blind landings, there are employed two beacons known as the inner and outer marker beacons. These markers are shown on map 16 in Fig. 2 and are designated O and I. In Fig. 2, two radio range stations L and R and a landing field 93 nearby station L are shown. The landing field 93 is equipped with inner and outer marker beacons, I and O respectively. As the pilot maneuvers into a generally correct position to make a blind landing, he will fly above the outer beacon O which transmits upwardly a carrier wave of 219 kilocycles modulated by a signal of 800 cycles and the pilot, when he hears this note, knowing that he is directly above this marker, realizes he must begin to lose altitude at a certain rate. As the plane continues toward the airport the pilot will hear a note of 400 cycles which is transmitted upon a carrier frequency of 201 kilocycles and he will know that he is then directly above the inner beacon and so he must check his rate of descent.

The 800 cycle note which in this invention simulates the outer beacon originates from the same oscillator 134 as does the 3000 cycle note. Of course, separate oscillators may be provided for this purpose without departing from the spirit of this invention. Referring to Fig. 4, the 800 cycle note is carried along wire 170 through switch 171 which is ordinarily in the closed position directly to terminal 3 of the switch 52 which is on the left transmitter. On the other hand, oscillator 172 generates the 400 cycle note which represents the inner beacon, the note being carried by means of wire 174 directly to the terminal 3 of switch 52 which governs the modulation that enters the right transmitter. So in all cases, in the illustrated embodiment, the left transmitter transmits the 800 cycle note while the right transmitter sends out the 400 cycle note. By placing the switches 52 on the terminals 3 of the control panel at the appropriate time, the instructor can transmit to the student the signal which tells him that he is above the simulated outer and inner marker beacons. As stated above, in this system of outer and inner marker blind landings, the outer marker usually transmits on a carrier frequency of 219 kilocycles, while the inner marker uses a frequency of 201 kilocycles. Therefore, the pilot in a plane must tune his receiver to the correct frequencies to get these notes. The instructor, using this invention, will always transmit the outer marker signal upon a carrier frequency of 219 kilocycles by setting the frequency control knob 59 of the left transmitting system to 219 kilocycles, and inner marker signal will be transmitted upon a carrier frequency of 201 kilocycles by setting frequency control knob 59 of the right transmitting system to 201 kilocycles. The student in the trainer, if he is to get these signals, must tune his receiver by means of the tuning knob 61 exactly as if he were making a real blind landing in a plane. This is very desirable for it trains the prospective pilot to perform these acts in the least possible time, a necessary feat in making a real blind landing.

Directly above an actual radio range station there is a cone of silence, and while the plane is in this cone, the signals transmitted completely fade out. To avoid any uncertainty whether this fade-out is caused by the cone of silence, most ranges are equipped with a type of marker beacon known as the Z-marker, which marker transmits directionally a steady 3000 cycle note on a carrier frequency of 75 megacycles. This note is transmitted so that the radiated field pattern fills the cone of silence. In my invention, when the instructor wishes to simulate the Z-marker, he places switch 156 in Figs. 3 and 7 on "Z." The student always gets this note in the earphones. The instructor may, as previously explained, also give the student a visual Z-marker signal by closing switch 148 or pressing button 168.

*Fading, static, and station interference*

In actual flight, pilots encounter many and diverse conditions which make radio reception difficult. Some of the more common of these are fading, static and station interference. Fading may be simulated in my invention by a manipulation by the instructor of the various volume controls or by the turning off of any one of the various switches which govern a given circuit. Static and station interference may be simulated in my invention by introducing into the modulated amplifiers 54, audio signals of the desired noise. The output of any receiver is a good noise source. These sources of external modulation are shown in Fig. 4 and designated 176, 178, 180 and 182. Switches 184 and 186 which are shown in Figs. 3 and 4 provide a choice between the two external sources of each transmitting system. From these switches the desired external modulation is fed into the associated amplifier 188 or 190 and thence into the associated modulator circuit and transmitter. Each of these amplifiers has a volume control 192 operatively connected to it.

*Code*

The sending of messages by code may also be accomplished by my invention. Referring to Fig. 4, a constant 800 cycle note is generated by oscillator 134 and passes through wire 170 to switch 171 which ordinarily is in the closed position as shown. If the instructor desires to send code signals to the student in the trainer he turns switch 171 to the "on" position as shown in Fig. 3. This breaks the circuit at switch 171 in Fig. 4. Then, in the usual manner, by means of manual code keyer 173, the instructor can complete the circuit between oscillator 134 and terminal 3 of switch 52, from where the signal is fed into modulated amplifier 54, if switch 52 is on terminal 3, where it modulates the radio frequency generated by oscillators 58. From there the modulated radio frequency wave goes to goniometers 62 and antenna 19.

*Means for selecting desired modulating source and transmitting frequency*

From all the preceding description, and by reference to Fig. 4, it will be appreciated that the aural modulating waves which enter either of the modulated amplifiers 54 to modulate the radio frequency tuned by the oscillators 58 depend upon the position of the selector switch 52 which governs the system (left or right) in question. As a switch 52 is provided for each of the transmitting systems, it is possible for each system to transmit different intelligence at the same time.

Referring to Fig. 6, it will be seen that each of the switches 52 is in reality a gang switch having four parts, each part designated generally as 194, 196, 198 and 200. Parts 194 and 196 determine what modulating electrical wave enters the modulated amplifier 54 of the transmitting system in question; part 200 of switch 52 with condensers 204 and 208 provides means to control the frequency of oscillator 58, while part 198 in conjunction with condensers 202 and 206 provides means to tune amplifier 54 in accordance with the frequency of oscillator 58. When either switch 52 is placed in position contacting terminal 1, by referring to Fig. 4 it will be seen that the modulating impulses that will enter the modulated amplifier 54 which is governed by that particular switch 52 are the 1020 cycle note as modified by the A-N and station identifying cams as well as the verbal intelligence which enters microphone 112. (However, operator controlled relay 116 which is governed by the radio-interphone switch 111 and student controlled relay 129 must be correctly positioned to connect microphone 112 and terminal 1 of the switch 52, and student controlled relay 48 must be correctly positioned). With the switch 52 in this position, oscillator 58, it will be seen, is tuned by variable condensers 204 and the modulated amplifier 54 is tuned by variable condensers 202. Variable condensers 204 may be adjusted by means of the associated frequency determining knob 59 to cause the associated oscillator 58 to emit a radio frequency of from 200 to 400 kilocycles and the turning of knob 59 simultaneously adjusts condensers 202 to correctly tune the associated amplifier 54 in accordance with the frequency generated by oscillators 58. Because of this provision, it is possible with my invention to transmit radio range signals and voice at any frequency used by radio range stations, and the student in the trainer must therefore tune his receiver to the correct frequency in order to receive the signals being transmitted. Inasmuch as the mechanism shown in Fig. 6 except the crossed loops 216 and 218 and receiving antenna 69 is provided in duplicate—one for each of the transmitting systems which may be combined in this invention—it is possible for each of the transmitting stations to transmit on a different frequency, and to have each of the carrier waves modulated by like or different audio-frequency waves.

When either of the switches 52 is such that contact is made with terminal 2, it will be seen from Figs. 4 and 6 that the only modulating waves which can enter my modulated amplifier units 54 are those which pass through microphone amplifier 120. These signals must originate at microphone 112. My invention is thus arranged because in actual practice modern airports have a traffic control tower which transmits verbal instructions. These control towers generally operate on a frequency of 278 kilocycles and when tuned to that frequency, the pilot receives only verbal instructions. Therefore, when switch 52 which is under the control of the instructor contacts terminal 2, the student is able to receive these simulated instructions.

Inasmuch as these airport control towers generally transmit on a frequency of 278 kilocycles, referring to parts 198 and 200 of Fig. 6, it will be seen that whenever switch 52 is in contact with terminal 2, fixed condenser 208 tunes oscillator 58 to a carrier wave of 278 kilocycles, and fixed condenser 206 tunes amplifier 54 in accordance therewith. For the student to receive these control tower instructions, he must, therefore, correctly tune his receiving set.

Whenever switch 52 of my left transmitter is connected to terminal 3, the only modulating wave which will affect the carrier wave which is generated in the left transmitter is the 800 cycle note which represents the outer beacon and the coded 3000 cycle note, and when this same contact is made upon switch 52 of my right transmitting system, the 400 cycle note representing an inner beacon marker is the only audio frequency source allowed to modulate the radio frequency carrier wave of the right transmitting system.

Whenever the switch 52 of either system is upon terminal 3 it will be seen that variable condensers 204 tune oscillator 58 while variable condensers 202 tune amplifier 54. It is therefore possible to tune the left transmitter to any desired frequency, and especially to 219 kilocycles which is the common frequency for the transmission of outer marker signals, and the right transmitter may also be tuned to any frequency, and especially to 201 kilocycles which is the frequency used in the transmission of inner marker signals. Whenever switches 52 are upon terminals 4, it will be seen in Fig. 4 that no modulation is allowed to enter modulated amplifiers 54 except those originating in noise sources 176, 178, 180 and 182. These noise sources are controlled by switches 184 and 186. It should be noticed that the audio signals represented by the noise sources 176, 178, 180 and 182 enter the modulated amplifiers 54 directly rather than through terminals 4 of the switches 52. This arrangement makes it possible to introduce noise signals regardless of the position of selector switches 52. The noise will be transmitted upon the same carrier frequency as the other modulating audio frequencies which are simultaneously entering the modulated amplifiers 54 through selector switches 52.

*Transmitting antenna*

In order that the preferred embodiment of the transmitting antenna used with my invention may be more easily understood a description of the antenna of the left transmitting system which is shown in the upper part of Fig. 6 will be given.

Referring to Fig. 6, it will be seen that the output of the modulated amplifier 54 of the left transmitting system is fed into coil 210 which is surrounded by two perpendicularly disposed coils 212 and 214. Coil 212 is in series with transmitting loop 216 and coil 214 is in series with transmitting loop 218. Receiving antenna 69 is in close proximity to transmitting loops 216 and 218.

Inasmuch as coil 210 is connected to the output of modulated amplifier 54 a modulated radio frequency voltage is present therein and this voltage induces a similar voltage in the coils 212 and 214. The voltage induced in these latter two coils causes a modulated radio frequency current to flow therein and because transmitting loop 216 is in series with coil 212 a modulated radio frequency current will flow in this loop. Also, a modulated radio frequency current flows in transmitting loop 218 because it is connected in series with coil 214. The modulated radio frequency currents flowing in transmitting loops 216 and 218 will introduce a voltage in non-directional receiving antenna 69 which is connected to the radio receiver in the trainer. Therefore, the student in the trainer, if he has properly tuned his radio receiver, will receive the audio signals which were introduced into the modulated amplifier 54 by the instructor, as previously explained.

Referring to the lower part of Fig. 6 which shows the corresponding parts of the right transmitting system of this invention, the modulated amplifier 54 of this system and the coils 210a, 212a and 214a function exactly with respect to transmitting loops 216 and 218 as do the corresponding parts of the left transmitting system explained immediately above. Inasmuch as the left and right transmitting systems generally transmit upon different carrier frequencies the use of the single pair of transmitting loops 216 and 218 will not result in interference.

*Radio direction finding means*

Radio direction finding means in real planes seek to determine the bearing of a radio station relative to the nose of the plane. This bearing depends upon two factors; first, the bearing from the station to the geographical location of the plane, and secondly, the heading of the plane.

In a plane such bearings are accomplished by means of a directional loop attached to a radio receiver, the loop being rotated until no signal is heard. Because the loop is highly directional, when no signal is heard the loop is perpendicular to the path of the oncoming waves, and therefore, the radio station lies in one of two directions, 180° apart. The pilot must then resolve this ambiguity by well known means. It should be stated that because the loop is highly directional it is used only when radio direction finding problems are being worked. At all other times, such as when flying by A-N signals and when receiving control tower instructions, a non-directional antenna is employed. The same is true in the use of my invention.

The following means make possible the working of radio direction finding problems in a grounded aviation trainer.

Reference is made to the upper part of Fig. 6 which shows the pertinent parts of the left transmitting system. Coil 210 is rotatably mounted within perpendicularly disposed coils 212 and 214 and the instructor or operator can change the position of coil 210 with respect to coils 212 and 214 by means of the azimuth control knob 220 shown at the left in Fig. 3. The strength of the modulated radio frequency voltages induced in coil 212 depends upon the position of rotatable transmitting coil 210 relative to coil 212 and, therefore, the current flowing in this coil and in transmitting loop 216 depends upon the rotatable position of coil 210. The same is true of coil 214 and transmitting loop 218. The orientation of the field strength pattern of the modulated radio frequency waves transmitted by loops 216 and 218 will likewise depend upon the position of rotatable coil 210 within coils 212 and 214. Inasmuch as the receiving antenna 69a is directional, the voltages induced in it will depend upon its position relative to the pattern transmitted by coils 216 and 218.

The instructor, observing the position of the recorder upon the map, ascertains the assumed bearing of the trainer from the left transmitting station and sets azimuth control knob 220 accordingly. The setting of this control knob places rotatable coil 210 within coils 212 and 214 and, therefore, a certain pattern of the modulated radio frequency carrier waves originating in modulated amplifier 54 of the left system is transmitted by loops 216 and 218. The magnitude of the current induced in directional receiving antenna 69a will therefore depend on this pattern which is controlled by the instructor. The student in the trainer therefore will turn receiving loop 69a to the position where he receives no signal and he then knows the plane of the receiving loop is perpendicular to the assumed path of the radio waves. The two possible directions to the station, 180° apart, relative to the nose of the trainer can then be ascertained.

As stated previously, the bearing of a radio station relative to the nose of the plane also depends upon the heading of the plane. In my invention, the instructor sets control knob 220 to form the correct pattern about transmitting loops 216 and 218 according to the assumed bearing from the station to the trainer. Then if the student turns trainer 10, reference to Fig. 1 will disclose that the position of loop 69a relative to the pattern transmitted by loops 216 and 218 will change. The student in the trainer will therefore have to rotate loop antenna 69a through an angle equal to the angle through which he has turned the trainer in order to place loop 69a in the no signal position. The bearing of the station from the nose of the trainer has therefore changed by the angle through which the student turned the trainer.

Then, if the instructor, by referring to the position of the recorder 12 on the map 16 ascertains that the assumed position of the trainer has changed in such a way as to cause a change in the bearing from the station to the trainer, he turns knob 220, thereby varying the pattern transmitted by loops 216 and 218, and the student must turn his loop 69a through an equal angle to again find the no-signal position. The bearing to the station relative to the nose of the plane has therefore changed, he will find, by the amount the instructor has turned knob 220.

Referring now to the bottom half of Fig. 6 which discloses the corresponding parts of my right transmitting system, coil 210a is rotatable within perpendicularly disposed coils 212a and 214a, and therefore these coils, transmitting loops 216 and 218 and loop antenna 69a provide a second system whereby radio direction finding problems may be worked. The provision of two such systems makes possible the finding of a simulated radio "fix" because if the student finds the bearing to two radio stations he must be at the intersection of the bearings.

However, it should be borne in wind that one such system only can provide valuable instruction in radio direction finding problems.

*Operation*

Fig. 2 is an enlarged view of a map upon which is a recorder 12. On his simulated "flight," the student will have with him a map similar to the one over which the recorder travels. He then knows what radio stations are along his proposed "flight," as well as all other necessary data pertaining to these stations. It will be noticed that the recorder has made a certain track over the map. As the recorder moves along such a track, the instructor transmits by the use of my invention the correct radio signals for every changing position of the recorder. The student in the trainer receives these signals and uses them to guide his "flight" exactly as does a pilot in a real plane.

The illustrated problem shows that originally the trainer was assumed to be at the position designated X. If a plane were actually at this point, which is on the bisector of the N quadrant of station R, a receiving set in the plane, if tuned to the frequency of station R, would hear the N signal. To simulate this, the instructor first turns master switch 77 on the control panel to the "on" position. The diagrammatic relation of master switch 77 to the other parts of my invention is not shown, it being deemed sufficient to state here that this switch controls the power flowing to many of the operating parts of this invention, such as the oscillators and amplifiers.

Having turned on master switch 77 the instructor then sets knob 59 of the right transmitting system at the frequency upon which radio station R transmits. The correct radio frequency will then be fed into modulated amplifier 54 of the right transmitting system. The instructor then places switch 90 on the control panel to the "on" position, thereby starting the rotation of the cams shown in Fig. 5. The instructor must then place identification selector knob 96 upon one of the five terminals shown in Figs. 3 and 5 in order that the desired station call signals will be transmitted when the A-N signals are interrupted by the working of cam 72. By performing these steps the A-N signals periodically interrupted by station call letters will be transmitted. Right knob 52 must then be set on terminal 1 so that selector switch 52 of my right transmitting system allows the range signals originating in oscillator 20 and keyed by the cams shown in Fig. 5 to enter modulated amplifier 54 as explained above in great detail. Knob 57 of my right transmitter, which controls the volume thereof, is set to simulate the distance of the point X from transmitting station R.

It will be noticed that the point X is on the bisector of the uppermost N quadrant of station R. At this point a plane would hear the N signal and the first station identification letters which are, as above explained, transmitted into the N quadrant, but the A signals and the second set of station identification call letters would be inaudible. Consequently, the instructor will place the A-N mixer 46 of the right transmitting station in its farthest clockwise position. These steps having been taken, the student, if he correctly tunes to the frequency of station R, will receive the range signals transmitted thereby, and these signals will exactly simulate the signals that a plane would receive were it actually where the trainer is assumed to be.

The instructor will, by observing the direction of point X from transmitting station R, position azimuth control knob 220 of my right transmitter in the correct position. As stated above, this will change the field pattern of this station so that the student may, if he desires, use direction finding means for ascertaining the bearing from his assumed position to the station.

The instructor having made these settings, the student in the trainer who is to fly to the landing field 93 nearby station L, if he correctly tunes his receiver to the frequency of station R, by the use of his non-directional antenna 69 will know that he is in one of the N quadrants of that station, for he will hear the N signal and then the first set of signals identifying station R, but he will not hear the A signal nor its accompanying station identification signals. Because of the complete absence of the A signals, the student will know that he is about on the bisector of one of the N quadrants of station R. If the student desires to take a radio bearing he will use his receiving loop 69a and he can get his no signal position or "null" but without more information this will not tell him in which direction station R lies—it will only tell him in which of two directions 180° apart the station lies. This is because, as above stated, when he turns his receiving loop to the "null" position, he knows the radio waves of station R are perpendicular to the plane of his receiving loop, but he cannot tell from which of the two possible directions the waves are coming.

However, because the student knows that he is near one of the bisectors of one of the N quadrants of station R, which bisector runs north and south, he knows that if he flies due north the signals which he receives from station R will increase or decrease in intensity depending upon whether he is flying toward or away from the station. So, using his non-directional antenna 69 as shown in Fig. 2, the student turns the trainer toward the north and flies toward the point X0. The instructor, seeing that the student is flying directly away from station R, turns knob 57 which governs the volume of the signals of station R to decrease the volume of the signals received by the student in the trainer. The student, noticing this decrease realizes that he is flying away from station R and therefore, he realizes that he must be in the north N quadrant of this station. This fact informs him of the general direction of station L, toward which he must fly and consequently, he turns the trainer about and flies toward the point X1 which is in the general direction of his objective.

As the recorder moves down toward the point X1, the instructor must increase the volume of the range signals transmitted by the proper turning of knob 57 of my right station and the A-N mixer 46 must be turned in a counterclockwise direction so that the student will receive the A and N signals in their proper relative intensities.

The assumed direction of the trainer from the station R changes as the assumed position of the trainer, as represented by the position of the recorder, changes, and, consequently, the instructor must turn azimuth control knob 220 to make provision for this change so that in the event the student desires to use his directional antenna 69a for direction finding he may do so. By the time the recorder is at the point X2, the A-N mixer 46 governing my right transmitting station will be at the 12 o'clock position, as shown in Fig. 3, and the A-N and station indentification signals received will be of equal intensity. At this point, the A signal and the N signal interlock to produce the on-course note, and the student will realize that he is somewhere along that "on-course" beam. As the recorder moves on to the position X3, the A-N mixer 46 of this same station will be gradually turned counterclockwise until at the point X3 the A signal and its accompanying station identification signal will be the only ones heard by the student in the trainer.

At about this point, a real plane would be able to intercept the range signals transmitted by station L. Consequently, the instructor must place the knob 59 of my left transmitting station at the correct frequency, place selector switch 52 on terminal 1, position knob 57 for the correct transmitter volume and set azimuth control knob 220 of the left transmitting station according to the direction of the plane from station L. Station identification switch 98 must be placed to give the correct call letters. It can be seen that as the recorder moves into the range of station L it is on the "on-course" beam of that station as shown at X4 and so the instructor will set the A-N mixer of the left transmitting system to the 12 o'clock position. The student will know which direction to turn to head for station L, and he does so, flying towards point X5.

At the same time, the trainer is assumed to be flying away from station R and consequently, the volume control 57 of my right transmitting station is manipulated by the instructor to correspondingly decrease the intensity of the signals being transmitted by this station. As the trainer turns toward the station and approaches point X5 the on-course signal is maintained and no change in direction takes place, but the intensity of the signals must be steadily increased.

At this point, the instructor may desire to render the reception of signals by the student in the trainer 10 difficult, and so he will throw the switch 184 as seen in Fig. 4 to the terminal of the desired noise source for a certain length of time.

When the trainer is assumed to be in the field pattern of the fan marker F1, the instructor will place marker beacon selector 156 on the terminal 1 and will close aural marker switch 146 for the length of time that the trainer is assumed to be in the field pattern of this beacon. Marker beacon volume control 136 will be adjusted to the correct position by the instructor. The student will get these signals through earphones 128 as shown in Fig. 7. Also, the instructor may give the visual fan marker signal if he desires by means of switch 148.

At the point X6, the student turns the trainer away from the on-course beam and so the instructor turns A-N mixer 46 of the left station clockwise. The student will hear the N signal louder than the A signal and will therefore turn back at the point X7 until he is again following the on-course beam X8.

The student continues to fly the on-course beam until he is directly above the station L. At this point, the instructor places the marker beacon selector 156 on the Z position and closes aural marker switch 146 for the correct length of time. Thus the student receives the "positive" cone of silence signal. Should the instructor desire that the visual marker also respond to this signal, he will, in addition to turning switch 156 to the correct position, also turn visual marker switch 148 to the "on" position. As shown in Fig. 7, the visual marker will then flash in the correct pattern, or the instructor may give these same visual signals by means of press button 168.

By referring to the map which he has with him in the trainer, the student knows that by turning in the direction of the point X9 and flying a given distance, he will encounter at the point X10 the outer marker beacon. As the student no longer has any need for the range signals but rather desires control tower instructions, he requests them over his interphone receiver previously mentioned and tunes his receiver to 278 kilocycles. When the verbal instructions are to be transmitted by means of microphone 112, the instructor will place control knob 52 of either transmitting system upon the second terminal. Condenser 208 will tune oscillator 58 to a carrier frequency of 278 kilocycles and fixed condenser 206 will correctly tune modulated amplifier 54, and, as the student has his receiver tuned to this frequency, he will receive the instructions transmitted. Having received instructions that it is safe for him to land, the student continues in the direction of the outer marker beacon O at the point X10. When the recorder shows that the trainer is above this point, the instructor will set knob 59 of the left system to 219 kilocycles and will then place selector switch 52 of the left transmitting system upon terminal 3 and so the 800 cycle outer marker note originating in oscillator 134 will be heard by the student if he has his receiver correctly tuned. The student will then begin to "lose altitude" at the correct rate. The inner marker beacon being at X11, the instructor will place the knob 59 of the right transmitting system on a frequency of 201 kilocycles and switch 52 on the third terminal to give the student the 400 cycle note for the correct length of time. The student will get this signal if he properly retunes his receiver and will then check his rate of descent and will "land" the trainer at the airport as though he were actually flying a plane.

*Summary*

By means of my invention, the student in the trainer may be thoroughly familiarized with the different types of signals encountered by a plane in actual flight. The handling of the aircraft in response to these signals, such as orientation, direction flying, making simulated blind landings, etc., may be learned as well as in a real plane in a real radio field pattern. Not only are the results achieved as satisfactory, but these results may be obtained in complete safety to the student pilot, the instructor, and to the trainer at a fraction of the cost of actual flight instruction. In a given length of time more may be learned in the art of flying by radio by the use of my simulated means because of the flexibility of my apparatus to simulate any desired circumstances. It is not necessary to fly a plane to a location where the desired situation prevails.

Also, by means of my apparatus the student may be thoroughly taught the limitations of flying by radio. Static, station interference, fading, the bending of radio beams and the spreading of the on-course beams beyond their usual 3° may all be introduced by the instructor as desired.

While my invention has been described in connection with a grounded trainer such as mentioned above, it is apparent that many features of it may be employed in a flying trainer, or even without the use of any type of trainer. Also, while many of the parts of this apparatus have been designated as performing a certain function, it will be apparent that they may be also employed in simulation of other phenomena, and that certain elements can be readily replaced by others. All such variations falling within the scope of the following claims are intended to be secured by these Letters Patent.

I claim:

1. In an apparatus for instruction and training in flying by radio, the combination of a plurality of sources of audio-frequency modulating waves; a modulated amplifier; a plurality of condensers for tuning said modulated amplifier; and a gang switch for simultaneously selecting a modulating source and one of said condensers.

2. In an apparatus for instruction and training in navigating by radio, for the purpose of simulating the direction of a trainer from a plurality of radio stations, the combination of a plurality of sources of modulated radio frequency carrier waves; a rotatable coil connected to each of said sources of modulated radio frequency carrier waves; a pair of perpendicularly disposed coils around each of said rotatable coils; a pair of crossed loops, each of said crossed loops being connected to one of each pair of perpendicularly disposed coils, and a rotatable directional receiving antenna adjacent said crossed loops.

3. In an apparatus for instruction and training in flying by radio the combination of a source of radio frequency waves; a plurality of sources of modulating audio-frequency waves; a switch to select any one of said sources of modulating audio-frequency waves; a code keyer for interrupting one of said sources of modulating audio-frequency waves; a fixed transmitting antenna; and a receiving antenna adjacent said transmitting antenna at a relatively fixed distance therefrom.

4. In an apparatus for instruction and training in flying by radio, the combination of an aviation trainer; a plurality of sources of audio frequency modulating waves; a source of radio frequency carrier waves; a plurality of means for controlling the frequency of said radio frequency carrier waves; and a single element for simultaneously selecting one of said modulating sources and one of said frequency controlling means.

5. In an apparatus for instruction and training in flying by radio, the combination of an aviation trainer, a plurality of sources of audio frequency modulating waves; a source of radio frequency carrier waves; a plurality of means for controlling the frequency of said radio frequency carrier waves including a fixed means for controlling the frequency of said waves; and a single element for simultaneously selecting one of said modulating sources and said fixed controlling means.

6. In an apparatus for instruction in navigating by radio, the combination of a plurality of sources of audiofrequency modulating waves; an oscillator; a plurality of means for tuning said oscillator; and a gang switch for simultaneously selecting a modulating source and one of said tuning means.

7. A trainer for instruction in navigating by radio comprising the combination of a source of modulated radio frequency carrier waves; a rotatable coil connected to said source of modulated radio frequency carrier waves; a pair of perpendicularly disposed coils around said rotatable coil; a transmitting antenna including a pair of crossed loops, each of said loops being connected to one of said perpendicularly disposed coils; and a directional receiving antenna in close proximity to said transmitting antenna and substantially the same distance therefrom at all times.

8. A trainer for instruction in navigating by radio comprising a seat for a student; radio receiving means including a directional receiving antenna associated with said seat for the use of a student therein; a source of modulated radio frequency carrier waves; a rotatable coil connected to said source of modulated radio frequency carrier waves; a pair of perpendicularly disposed coils around said rotatable coil; and a transmitting antenna including a pair of crossed loops in close proximity to said receiving antenna and substantially the same distance therefrom at all times, each of said loops being connected to one of said perpendicularly disposed coils; an artificial surface; a flight simulating device mounted for movement over said artificial surface; and a control element adjacent said artificial surface for selectively positioning said rotatable coil.

9. A trainer for instruction in navigating by radio comprising radio receiving means including a directional receiving antenna for the use of a student; a plurality of sources of modulated radio frequency carrier waves; a rotatable coil connected to each of said sources of modulated radio frequency carrier waves; a pair of perpendicularly disposed coils around each of said rotatable coils; a pair of crossed loops, each of said crossed loops being connected to one of each pair of perpendicularly disposed coils; an artificial surface; a flight simulating device mounted for movement over said artificial surface; and a plurality of control elements adjacent said artificial surface, each of said control elements being connected to one of said rotatable coils for selectively positioning the same.

GREGOR L. LANG.

REFERENCES CITED

The following references are of record in the file of this patent:

UNITED STATES PATENTS

| Number | Name | Date |
|---|---|---|
| 1,331,817 | McNab | Feb. 24, 1920 |
| 1,584,660 | Scherbius | May 11, 1926 |
| 1,825,462 | Link | Sept. 29, 1931 |
| 2,099,857 | Link | Nov. 23, 1937 |
| 2,110,869 | Crane | Mar. 15, 1938 |
| 2,119,083 | Link | May 31, 1938 |
| 2,164,412 | Koster | July 4, 1939 |
| 2,179,663 | Link | Nov. 14, 1939 |
| 2,212,931 | Colvin | Aug. 27, 1940 |
| 2,226,726 | Kramar | Dec. 31, 1940 |
| 2,312,962 | De Florez | Mar. 2, 1943 |
| 2,321,799 | Cone | June 15, 1943 |
| 2,326,764 | Crane | Aug. 17, 1943 |
| 2,332,523 | Norden | Oct. 26, 1943 |